United States Patent
Nakano et al.

(10) Patent No.: US 8,676,429 B2
(45) Date of Patent: Mar. 18, 2014

(54) AUTONOMOUS MOBILE DEVICE

(75) Inventors: Tsuyoshi Nakano, Kyoto (JP); Shoji Tanaka, Kyoto (JP)

(73) Assignee: Murata Machinery, Ltd., Kyoto (JP)

( * ) Notice: Subject to any disclaimer, the term of this patent is extended or adjusted under 35 U.S.C. 154(b) by 0 days.

(21) Appl. No.: 13/513,202

(22) PCT Filed: Oct. 22, 2010

(86) PCT No.: PCT/JP2010/006259
§ 371 (c)(1),
(2), (4) Date: Jun. 1, 2012

(87) PCT Pub. No.: WO2011/067887
PCT Pub. Date: Jun. 9, 2011

(65) Prior Publication Data
US 2012/0239240 A1    Sep. 20, 2012

(30) Foreign Application Priority Data
Dec. 2, 2009  (JP) ................ 2009-274519

(51) Int. Cl.
*G01C 22/00*  (2006.01)
*G05D 1/00*  (2006.01)

(52) U.S. Cl.
USPC ......................................... 701/25

(58) Field of Classification Search
USPC ......................................... 701/25
See application file for complete search history.

(56) References Cited

U.S. PATENT DOCUMENTS

| | | | | |
|---|---|---|---|---|
| 4,962,453 A | * | 10/1990 | Pong et al. | 701/23 |
| 5,400,244 A | * | 3/1995 | Watanabe et al. | 701/28 |
| 5,570,285 A | * | 10/1996 | Asaka et al. | 701/23 |
| 5,777,690 A | * | 7/1998 | Takeda et al. | 348/699 |
| 6,058,339 A | * | 5/2000 | Takiguchi et al. | 701/28 |

(Continued)

FOREIGN PATENT DOCUMENTS

| JP | 07-325620 A | | 12/1995 |
|---|---|---|---|
| JP | 7-325620 A | * | 12/1995 |

(Continued)

OTHER PUBLICATIONS youtube video: RFS1:Diginfo Diginfonews uploaded Dec. 18, 2007 http://www.youtube.com/watch?v=TWkd4ELRGeg.*

(Continued)

*Primary Examiner* — Mary Cheung
*Assistant Examiner* — Frederick Brushaber
(74) *Attorney, Agent, or Firm* — Keating & Bennett, LLP

(57) ABSTRACT

An autonomous mobile device is capable of taking action that is suitable to execute a task in accordance with a given situation includes and executes a predetermined task upon autonomously moving to a destination. The autonomous mobile device includes a storage unit that stores an environment map, a laser range finder that acquires peripheral obstacle information, an unknown information identification unit that identifies unknown obstacle information from the peripheral obstacle information, an assessment information acquisition unit that acquires a plurality of types of assessment information including movement information, relative position information, and attribute information that are related to the unknown obstacle, when the unknown obstacle information is identified, and a scenario selection unit that selects, based on the assessment information, one action scenario among a plurality of action scenarios including an action scenario which is defined to execute the task and is other than an action scenario to cancel or continue the execution of the task.

17 Claims, 16 Drawing Sheets

(56) References Cited

U.S. PATENT DOCUMENTS

| | | | |
|---|---|---|---|
| 7,317,388 B2 * | 1/2008 | Kawabe et al. | 340/539.13 |
| 7,363,125 B2 * | 4/2008 | Hashimoto et al. | 701/23 |
| 7,463,948 B2 * | 12/2008 | Orita | 700/245 |
| 7,660,665 B2 * | 2/2010 | Tamamoto et al. | 701/526 |
| 7,778,776 B2 * | 8/2010 | Goto et al. | 701/301 |
| 2010/0235033 A1 | 9/2010 | Yamamoto et al. | |
| 2011/0035086 A1 * | 2/2011 | Kim et al. | 701/23 |

FOREIGN PATENT DOCUMENTS

| | | |
|---|---|---|
| JP | 2005-157625 A | 6/2005 |
| JP | 2005-209090 A | 8/2005 |
| JP | 2008-065755 A | 3/2008 |
| KR | 10-2009-0032130 A | 3/2009 |
| WO | 2008/032673 A1 | 3/2008 |

OTHER PUBLICATIONS

Cleanfax.com, "Floor Cleaing Robot Rides Elevator" Dec. 22, 2006.*

Official Communication issued in International Patent Application No. PCT/JP2010/006259, mailed on Nov. 30, 2010.

Official Communication issued in corresponding International Application PCT/JP2010/006259, issued on Jul. 10, 2012.

* cited by examiner

TIME t 51  45          64 65 66
TIME (t-1)

DIFFERENTIAL PROCESSING RESULT

AUTONOMOUS MOBILE DEVICE

BACKGROUND OF THE INVENTION

1. Field of the Invention

The present invention relates to an autonomous mobile device that autonomously moves to a destination.

2. Description of the Related Art

Conventionally, an autonomous mobile device stores, in advance, map information showing the configuration and layout of the environment, and uses this map information and peripheral measuring results of a sensor to autonomously move to a destination while avoiding obstacles (for example, refer to Japanese Patent Application Publication No. 2005-157625). The autonomous mobile device described in Japanese Patent Application Publication No. 2005-157625 stores, in addition to the map information, information on concave portions on which the autonomous mobile device can travel so as to avoid concave portions which become an obstacle on the travel surface, and is stopped when a concave portion that is not included in the map information is detected by a sensor while the autonomous mobile device is traveling.

Meanwhile, there are cases in which an autonomous mobile device is required to autonomously execute tasks such as boarding an elevator or docking to a charging station. Normally, these tasks are executed within an environment containing obstacles that are not included in the map information; for instance, moving obstacles such as people and cardboard boxes which are temporarily placed. Thus, the autonomous mobile device needs to execute the foregoing tasks while avoiding these obstacles.

Nevertheless, if the setting is such that the autonomous mobile device is stopped when an obstacle, which is not included in the map information, is detected, as with the autonomous mobile device described in Japanese Patent Application Publication No. 2005-157625, there is a possibility that the execution of the task will be frequently canceled. For example, when the autonomous mobile device is to execute the task of boarding an elevator, even if the execution of the task is re-tried after once canceling the boarding process as a result of detecting a person in the elevator, so as long as someone is in the elevator, the execution of the task will be canceled. In the foregoing case, there is a possibility that much time will be required to complete the task.

Even in cases where there are obstacles that are not included in the map information, the task can be completed quickly if it is possible to take action that is suitable for executing that task in accordance with the situation.

SUMMARY OF THE INVENTION

Thus, preferred embodiments of the present invention provide an autonomous mobile device capable of taking action that is suitable for the execution of a task in accordance with the situation.

An autonomous mobile device according to a preferred embodiment of the present invention executes a predetermined task upon autonomously moving to a destination and includes a known information storage device that stores information on known obstacles, a peripheral information acquisition device that acquires peripheral obstacle information, an identification device that identifies information on an unknown obstacle that is different from the known obstacles stored in the known information storage device, from the peripheral obstacle information acquired by the peripheral information acquisition device, an assessment information acquisition device that acquires assessment information related to the unknown obstacle when the information on the unknown obstacle is identified by the identification device, a scenario storage device that stores a plurality of action scenarios including an action scenario which is defined to execute the task and is other than an action scenario to cancel or continue the execution of the task, and a selection device that selects one action scenario among the plurality of action scenarios stored in the scenario storage device based on the assessment information acquired by the assessment information acquisition device.

According to a preferred embodiment of the autonomous mobile device of the present invention, upon executing a task, information on an unknown obstacle that is different from the known obstacles is identified by the identification device from the acquired peripheral obstacle information. When the information on the unknown obstacle is identified, assessment information related to the unknown obstacle is acquired by the assessment information acquisition device. In addition, one action scenario among the plurality of action scenarios is selected by the selection device based on the acquired assessment information. Here, the plurality of action scenarios include an action scenario which is defined to execute the task. The action scenario defined to execute the task is an action scenario other than the action scenario of canceling or continuing the execution of the task. In other words, it is possible to select an action scenario suitable to execute the task in accordance with the situation other than canceling or continuing the execution of the task. Accordingly, even in cases where an unknown obstacle exists, it is possible to take action that is suitable to execute the task in accordance with the situation without having to cancel the execution of the task.

For example, upon executing the task of boarding an elevator, when a person near the entrance inside the elevator is identified as an unknown obstacle, it is possible to select an action scenario to transmit a speech of "I am boarding the elevator" or the like. If that person moves to the rear of the elevator as a result of hearing the foregoing speech, the autonomous mobile device can board the elevator without colliding with that person. In other words, by selecting the action scenario to request a person to move in accordance with the situation rather than canceling the execution of the task, the task can be completed quickly. Note that the plurality of action scenarios stored in the scenario storage device may also include an action scenario to cancel or continue the execution of the task.

With the autonomous mobile device according to a preferred embodiment of the present invention, preferably, the assessment information acquisition device acquires a plurality of types of assessment information, and, upon selecting the action scenario based on the plurality of types of assessment information acquired by the assessment information acquisition device, the selection device selects the action scenario based on comprehensive information obtained by computing using at least one type of assessment information for each of the plurality of action scenarios.

In the foregoing case, since the action scenario is selected based on a plurality of types of assessment information, it is possible to select an action scenario that is more suitable for the situation. Moreover, since comprehensive information obtained by computing using at least one type of assessment information for each of the plurality of action scenarios is used, information which integrates the plurality of types of assessment information for each of the plurality of action scenarios will be used. Consequently, it is possible to accurately execute complicated information processing of selecting one action scenario from a plurality of action scenarios based on a plurality of types of assessment information.

With the autonomous mobile device according to a preferred embodiment of the present invention, preferably, the assessment information acquisition device acquires, as the assessment information related to the unknown obstacle, at least two types of information from among movement information related to the movement of the unknown obstacle, relative position information related to the relative position of the unknown obstacle relative to the autonomous mobile device, and attribute information of a zone where the unknown obstacle exists.

In the foregoing case, upon executing a task involving movement, it is possible to select the optimal action scenario according to the movement of the obstacle, positional relationship of the autonomous mobile device and the obstacle, and attribute of the zone where the obstacle exists.

With the autonomous mobile device according to a preferred embodiment of the present invention, preferably, the scenario storage device stores the plurality of action scenarios for each of the plurality of tasks, and the selection device selects one action scenario from the plurality of action scenarios in accordance with the respective tasks. In the foregoing case, it is possible to select the action scenario according to the task to be executed in accordance with the situation.

With the autonomous mobile device according to a preferred embodiment of the present invention, preferably, the known information storage device stores, as the information on the known obstacle, an environment map showing a zone of the known obstacle, and the identification device identifies the information on the unknown obstacle by comparing the peripheral obstacle information with the environment map.

In the foregoing case, information on the unknown obstacle can be identified by using the environment map which is used to create a path plan. Moreover, in the foregoing case, when the autonomous mobile device creates a path plan using the environment map and executes a task on the path thus planned, the autonomous mobile device identifies the information on the unknown obstacle and selects the action scenario according to that situation. In other words, it is possible to deal with unknown obstacles which cannot be dealt with only via path planning.

With the autonomous mobile device according to a preferred embodiment of the present invention, preferably, the assessment information acquisition device generates the movement information based on history of the information on the unknown obstacle. In the foregoing case, it is possible to generate assessment information by using information on the identified unknown obstacle.

With the autonomous mobile device according to a preferred embodiment of the present invention, preferably, the assessment information acquisition device generates the movement information for each sample of the information on the unknown obstacle. In addition, with the autonomous mobile device according to a preferred embodiment of the present invention, preferably, the assessment information acquisition device acquires the movement information, the relative position information, and the attribute information for each sample of the information on the unknown obstacle. In the foregoing case, it is possible to select an action scenario that is more suitable for the situation.

With the autonomous mobile device according to a preferred embodiment of the present invention, preferably, the relative position information is a score that is assigned to each of segments of the zone where the unknown obstacle exists based on the position of the autonomous mobile device. In the foregoing case, it is possible to set a score for each segment according to the level of interference of the autonomous mobile device and the obstacle during the execution of the task. Accordingly, it is possible to select an action scenario that is more suitable for the situation.

With the autonomous mobile device according to a preferred embodiment of the present invention, preferably, the segments are separated by a plurality of straight lines extending radially from the position of the autonomous mobile device, and by a plurality of concentric circles about the position of the autonomous mobile device. In the foregoing case, since the score according to the direction and distance based on the autonomous mobile device can be used as the relative position information, it is possible to accurately select the action scenario according to the position of the unknown obstacle relative to the autonomous mobile device.

With the autonomous mobile device according to a preferred embodiment of the present invention, preferably, the scores are assigned to the segments for each of the tasks. It is thereby possible to select the action scenario by using the relative position information according to the task.

With the autonomous mobile device according to a preferred embodiment of the present invention, preferably, the segments to which the scores are assigned are within a range in which the peripheral obstacle information can be acquired by the peripheral information acquisition device. It is thereby possible to inhibit the amount of information of the scores to be stored.

With the autonomous mobile device according to a preferred embodiment of the present invention, preferably, the peripheral obstacle information is information on an obstacle existing above a travel surface of the autonomous mobile device. As a result of using information on an unknown obstacle that is identified from the peripheral obstacle information, it is possible to select an action scenario that is more suitable for the situation.

With the autonomous mobile device according to a preferred embodiment of the present invention, the peripheral information acquisition device preferably includes at least one of a laser range finder, a stereo camera, and an ultrasound sensor.

With the autonomous mobile device according to a preferred embodiment of the present invention, the task to be executed, for example, is boarding an elevator or docking to a charging station.

According to various preferred embodiments of the present invention, it is possible to take action that is suitable to execute a task in accordance with the situation.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Preferred embodiments of the present invention are now explained in detail with reference to the drawings.

Figure 1:
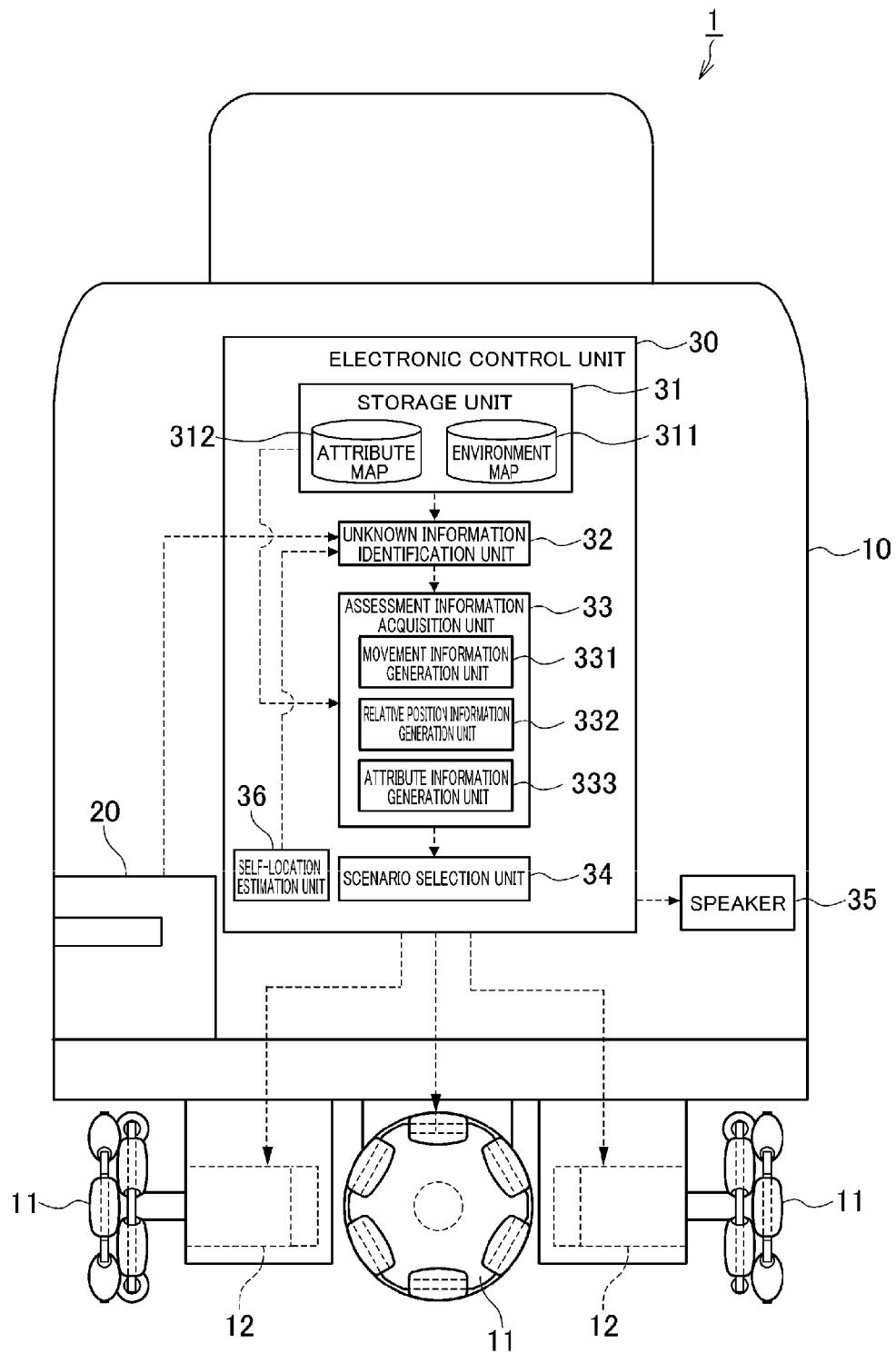
FIG. 1 is a diagram explaining the configuration of the autonomous mobile device according to a preferred embodiment of the present invention.

The configuration of an autonomous mobile device 1 according to a preferred embodiment of the present invention is foremost explained with reference to FIG. 1. FIG. 1 is a diagram explaining the configuration of the autonomous mobile device 1 according to the present preferred embodiment. The autonomous mobile device 1 is a device which autonomously moves to a destination by avoiding obstacles such as people and objects. For example, the autonomous mobile device 1 travels from a present location on the first floor in a building such as a hospital along a passage while avoiding obstacles, moves to the second floor using an elevator, and docks to a charging station by itself.

The execution of tasks that involve movement such as boarding or exiting an elevator or docking to a charging station is relatively complex in comparison to traveling along a passage. Thus, the autonomous mobile device 1 performs information processing that is suitable for the execution of a task by launching a dedicated program set for each task upon executing that task, selects an action scenario that is suitable for the execution of the task in accordance with the situation, and then executes that action scenario.

The autonomous mobile device 1 preferably includes a hollow cylindrical main body 10 preferably made of metal, four omni wheels 11 provided at the lower side of the main body 10, and an electric motor 12 that drives the omni wheels 11. The autonomous mobile device 1 can move in an arbitrary direction on a travel surface by the rotation of the omni wheels 11. Moreover, the autonomous mobile device 1 includes a laser range finder 20 that detects peripheral obstacles, an electronic control unit 30 that is arranged and programmed to comprehensively control the autonomous movement, and a speaker 35 that transmits speech or sound.

The laser range finder 20 is mounted at the front of the main body 10, emits a laser preferably in a fan shape having a central angle of about 240°, for example, and centered around the autonomous mobile device in a horizontal direction, and measures the propagation time of the reflected wave that was reflected off an obstacle with respect to the respective emission angles. The emission angle, and the distance that is calculated from the propagation time of the reflected wave, are the peripheral obstacle information of peripheral obstacles existing above the travel surface of the autonomous mobile device 1. In other words, the laser range finder 20 is a non-limiting example of a peripheral information acquisition device recited in the claims. The scanning range of the laser range finder 20 is, for example, a zone in which the radius centered around the autonomous mobile device is about 4 m and of a fan shape in which the central angle is horizontally about 240° centered around the front direction, for example.

The electronic control unit 30 inputs the measuring result that was output from the laser range finder 20, performs various types of computation processing such as calculating the zone where an obstacle exists, and thereby controls the autonomous travel. The electronic control unit 30 preferably includes a microprocessor that performs computations, a ROM that stores programs and the like which are used to cause the microprocessor to perform various types of processing, a RAM that temporarily stores various types of data such as the computational results, a backup RAM that retains such stored contents, and so on.

The electronic control unit 30 preferably includes a storage unit 31 including a backup RAM, and the storage unit 31 stores an environment map 311. The environment map 311 is information showing the zone which is occupied by known obstacles. In other words, the storage unit 31 is a non-limiting example of a known information storage device recited in the claims. Note that the zone which is occupied by known obstacles is, for example, a zone in which walls, pillars, furniture and the like are disposed, and is a zone where the autonomous mobile device 1 is unable to travel.

The electronic control unit 30 uses the environment map 311 and the measuring result of the laser range finder 20, and controls the autonomous travel to a destination by avoiding obstacles while estimating the self-location of the autonomous mobile device on the environment map 311.

Via points for each task to be executed by the autonomous mobile device 1 are registered in advance by the administrator in the environment map 311. The electronic control unit 30 performs path planning so as to pass through the via points of the task to be executed upon planning the traveling path to the destination. In addition, after detecting that the autonomous mobile device reached the via point during the autonomous movement on the path, the electronic control unit 30 launches the execution program of the corresponding task, and starts the execution of the task. For example, the boarding position of an elevator is set as the via point in relation to the task of "board elevator". After detecting that the autonomous mobile device reached the via point associated with the task of "board elevator", the electronic control unit 30 starts the execution of the task of "board elevator".

In order to perform the action scenario that is suitable for the task in accordance with the situation when an unknown obstacle that is not included in the environment map 311 is detected, the electronic control unit 30 preferably includes an unknown information identification unit 32, an assessment information acquisition unit 33, a scenario selection unit 34, and a self-location estimation unit 36. Moreover, the storage unit 31 stores, in addition to the foregoing environment map 311, an attribute map 312, and a plurality of action scenarios set for each task. In other words, the storage unit 31 is a non-limiting example of a scenario storage device recited in the claims.

The self-location estimation unit 36 estimates the self-location of the autonomous mobile device on the environment map 311. In order to estimate the self-location of the autonomous mobile device, the self-location estimation unit 36 uses, for example, the results upon comparing the shape of the obstacle comprehended from the peripheral obstacle information based on the laser range finder 20 with the shape of the obstacle of the environment map 311, the travel distance of the autonomous mobile device 1 that is computed from the rotation or the like of the electric motor 12, and so on. In the foregoing case, the self-location estimation unit 36 estimates the self-location of the autonomous mobile device by comparing a local map created based on the peripheral obstacle information with the laser range finder 20 as the point of origin and the environment map 311 in consideration of the travel distance of the autonomous mobile device 1.

The unknown information identification unit 32 performs coordinate transformation to the peripheral obstacle information in accordance with the coordinate system of the environment map 311 based on the self-location of the autonomous mobile device that was estimated by the self-location estimation unit 36. In addition, the unknown information identification unit 32 identifies unknown obstacle information on an unknown obstacle that is not on the environment map 311 from among the peripheral obstacle information that was subject to coordinate transformation. In other words, the unknown information identification unit 32 is a non-limiting example of an acquisition device recited in the claims. Unknown obstacle information is, for example, information showing the distance and emission angle of the reflected wave that was reflected off an unknown obstacle not included on the environment map 311 such as a person or luggage existing in the elevator.

Figure 2A:
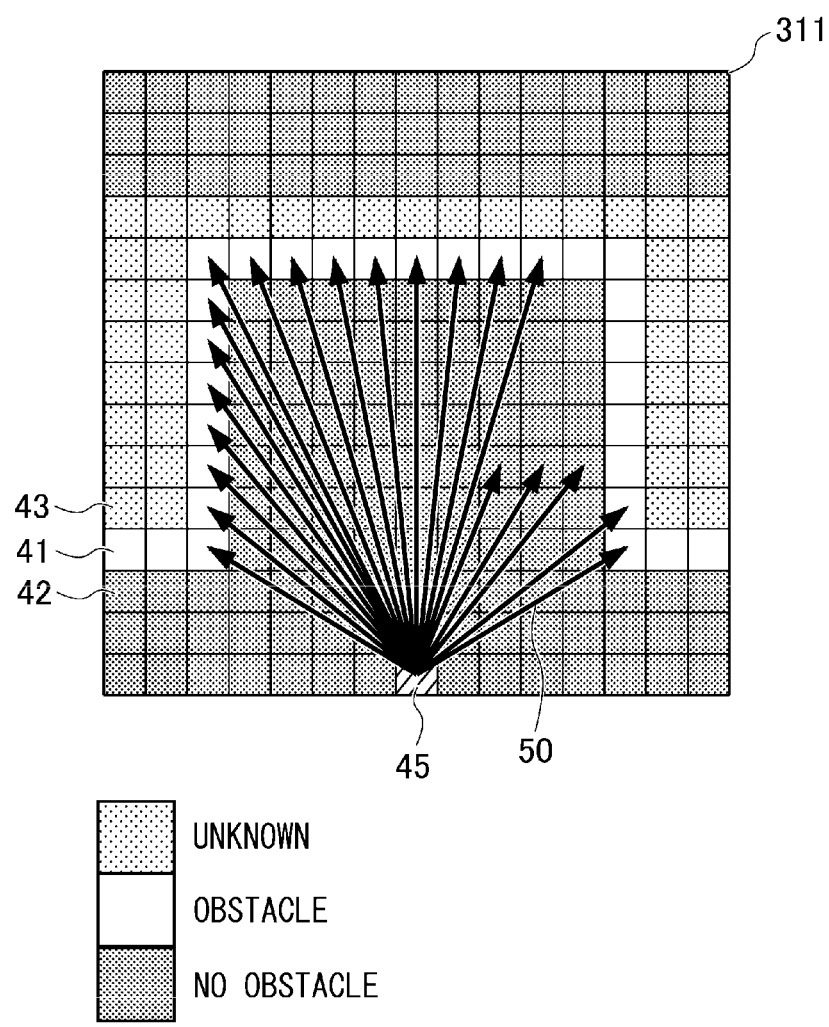
FIG. 2A is a diagram explaining the unknown information identification unit provided in the autonomous mobile device.
Figure 2B:
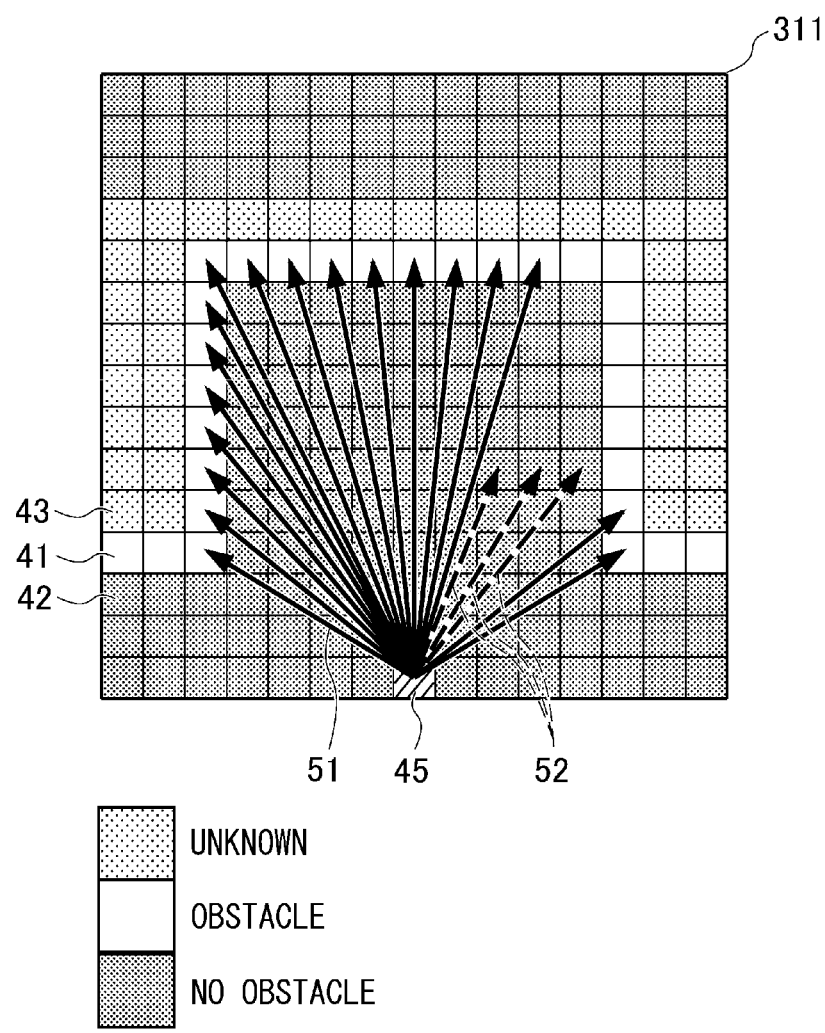
FIG. 2B is a diagram explaining the unknown information identification unit provided in the autonomous mobile device.

The method of identifying the unknown obstacle information is now explained with reference to FIG. 2A and FIG. 2B. FIG. 2A and FIG. 2B are diagrams explaining the unknown information identification unit 32. FIG. 2A shows peripheral obstacle information, and FIG. 2B shows unknown obstacle information that is identified from the peripheral obstacle information. In the environment map 311 shown in FIG. 2A and FIG. 2B, a white zone 41 shows the zone where the known obstacles exist, a dark gray zone 42 shows the zone where the known obstacles do not exist, and a light gray zone 43 shows the zone where it is unclear as to whether a known obstacle exists.

To explain taking the environment map 311 showing the area around the elevator as an example, the white zone 41 includes three wall surfaces configuring the elevator car, and the zone in the dark gray zone 42 in which three sides are surrounded by the zone 41 corresponds to the zone in the elevator car. The position 45 shown with a hatching is a via point registered in relation to the task of "board elevator", and is the boarding position for boarding the elevator. The execution of the task is started after the autonomous mobile device 1 reaches the position 45, and, for example, a laser is output from the laser range finder 20 toward the elevator. Consequently, the autonomous mobile device 1 scans the inside of the elevator car, and acquires the peripheral obstacle information 50.

In FIG. 2A, the peripheral obstacle information 50 obtained by the laser range finder 20 is shown with arrows. One arrow is sensor information showing a pair of the emission angle and distance obtained from the measurement result of one sample. In FIG. 2B, the known obstacle information 51 among a plurality of peripheral obstacle information 50 is shown with solid line arrows, and the unknown obstacle information 52 is shown with broken line arrows.

The known obstacle information 51 is sensor information based on the reflected wave that was reflected by the known obstacles contained on the environment map 311, and is identified by comparing the peripheral obstacle information 50 with the environment map 311. The unknown obstacle information 52 is information on an obstacle that is not on the environment map 311, and is identified by the unknown information identification unit 32. The unknown information identification unit 32 identifies the unknown obstacle information 52 by subtracting the known obstacle information 51 from the peripheral obstacle information 50.

When the unknown obstacle information 52 is identified, the assessment information acquisition unit 33 acquires a plurality of types of assessment information related to the unknown obstacle. In other words, the assessment information acquisition unit 33 is a non-limiting example of an assessment information acquisition device recited in the claims. The assessment information acquisition unit 33 generates assessment information by using the unknown obstacle information 52 obtained by subtracting the known obstacle information 51 from the peripheral obstacle information 50. As a result of excluding the known obstacle information 51 as described above, the amount of calculation can be reduced.

The assessment information includes at least movement information, relative position information, and attribute information. The assessment information acquisition unit 33 preferably includes a movement information generation unit 331 that generates movement information, a relative position information generation unit 332 that generates relative position information, and an attribute information generation unit 333 that generates attribute information.

Movement information is information showing whether the measurement point of the unknown obstacle information 52 is dynamic or static. Unknown obstacle information of one sample shows that an unknown obstacle existed at a measurement point at a certain point in time, and the movement information generation unit 331 identifies whether the measurement point is dynamic or static based on the history of that unknown obstacle information 52.

Here, the measurement point of the unknown obstacle information 52 being dynamic refers to a case where an unknown obstacle exists at the measurement point at a certain point in time, and an unknown obstacle does not exist at that measurement point at a different point in time. The measurement point of the unknown obstacle information 52 being static refers to a case where an unknown obstacle exists at the measurement point at a certain point in time, and an unknown obstacle also exists at that measurement point at a different point in time. In other words, when the unknown obstacle is something that moves such as a person, due to a change in the zone where the unknown obstacle exists, the measurement point of the changed portion is determined to be dynamic. When the unknown obstacle is something that does not move such as luggage, since the zone where the unknown obstacle exists is not changed, the measurement point in that zone is determined to be static.

Figure 3A:
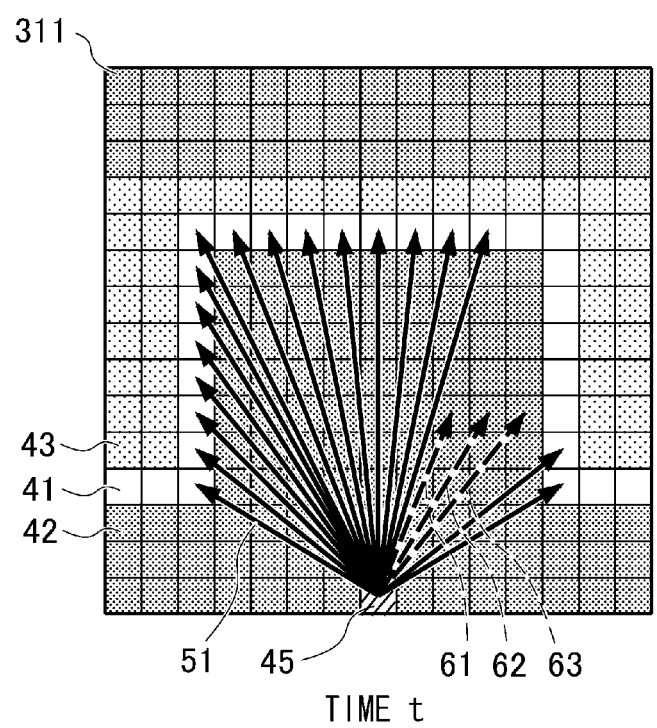
FIG. 3A is a diagram explaining the movement information generation unit provided in the autonomous mobile device.
Figure 3A:
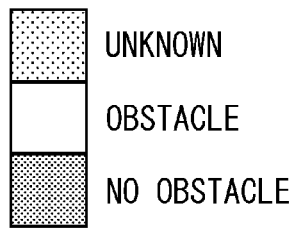
Figure 3B:
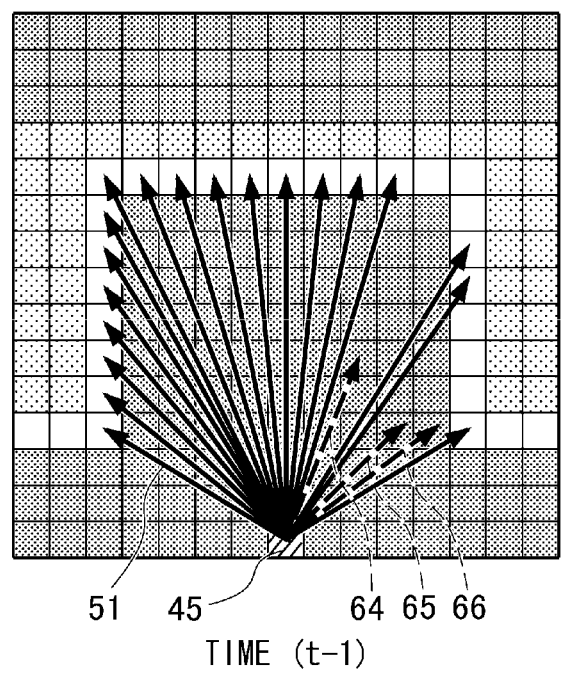
FIG. 3B is a diagram explaining the movement information generation unit provided in the autonomous mobile device.
Figure 3B:
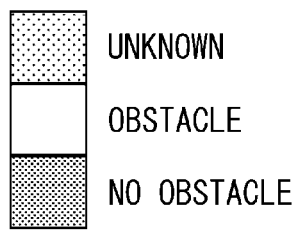
Figure 3C:
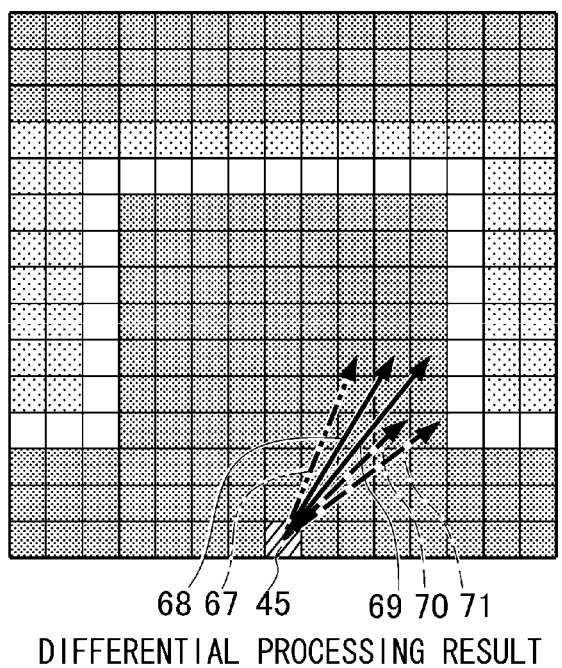
FIG. 3C is a diagram explaining the movement information generation unit provided in the autonomous mobile device.

The movement information generation unit 331 acquires unknown obstacle information of n (n: natural number) frames at a predetermined time interval, and performs differential processing by comparing the unknown obstacle information obtained at time t respectively with the unknown obstacle information obtained at time t-1, t-2, . . . , t-n. As a result of using the unknown obstacle information 52 that was subject to coordinate transformation in accordance with the coordinate system of the environment map 311, the movement information generation unit 331 can generate movement information by comparing the unknown obstacle information 52 acquired at different times even when the autonomous mobile device 1 is moving. The differential processing of the unknown obstacle information obtained at time t and the unknown obstacle information obtained at time t-1 is now explained with reference to FIG. 3A to FIG. 3C. FIG. 3A to FIG. 3C are diagrams explaining the movement information generation unit 331.

FIG. 3A is a diagram showing the known obstacle information 51 and the unknown obstacle information 61 to 63 obtained at time t. FIG. 3B is a diagram showing the known obstacle information 51 and the unknown obstacle information 64 to 66 obtained at time t-1. FIG. 3C is a diagram showing the results of the differential processing of comparing the unknown obstacle information 61 to 63 obtained at time t with the unknown obstacle information 64 to 66 obtained at time t-1.

In FIG. 3C, the matched sample 67 shown with the dashed-two dotted line arrow is the unknown obstacle information 61, 64 which matched at time t and time t-1. The mismatched samples 68, 69 shown with the solid line arrow are the unknown obstacle information 62, 63 which were detected at time t but not detected at time t-1. The mismatched samples 70, 71 are the unknown obstacle information 65, 66 which were detected at time t-1 but not detected at time t.

Similarly, the movement information generation unit 331 performs the differential processing of the unknown obstacle information obtained at time t and the unknown obstacle information obtained at time t-2, . . . , t-n. In addition, the movement information generation unit 331 generates movement information of "no movement" regarding samples that matched at all points in time, and generates movement information of "movement" regarding other samples. The movement information generation unit 331 thereby identifies whether the zone where an unknown obstacle exists is dynamic or static for each sample. Note that, in order to obtain the unknown obstacle information 52 of a slow-moving obstacle, the number of frames n needs to be sufficiently increased.

Relative position information is information related to the relative position of the zone where the unknown obstacle exists relative to the autonomous mobile device. More specifically, the relative position information is the score that is assigned to the segment of the zone where the unknown obstacle exists based on the position of the autonomous mobile device.

Figure 4A:
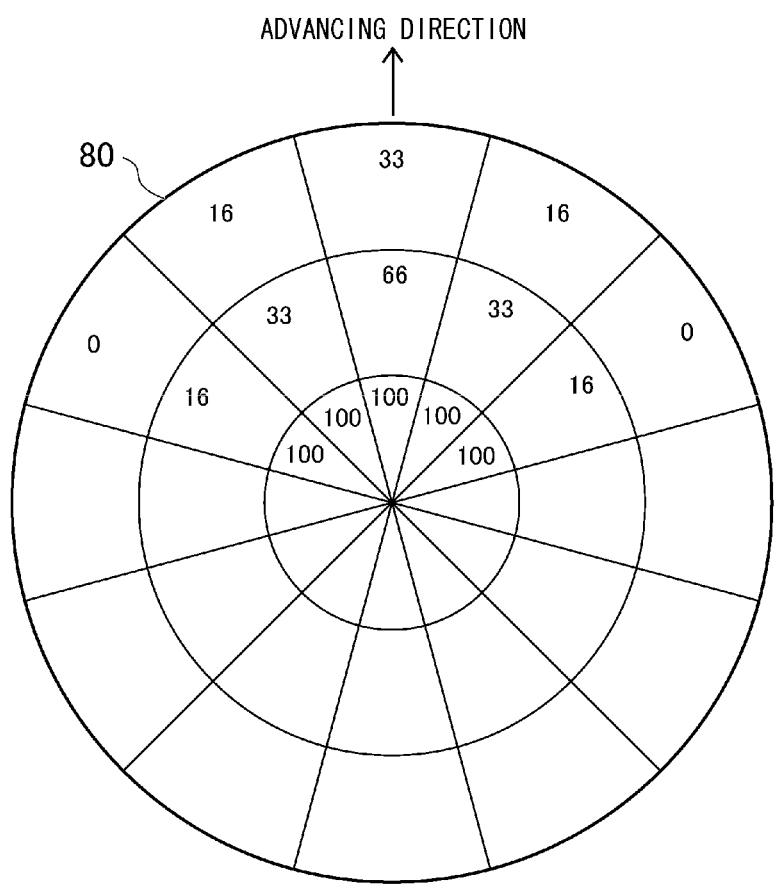
FIG. 4A is a diagram explaining the relative position information generation unit provided in the autonomous mobile device.
Figure 4B:
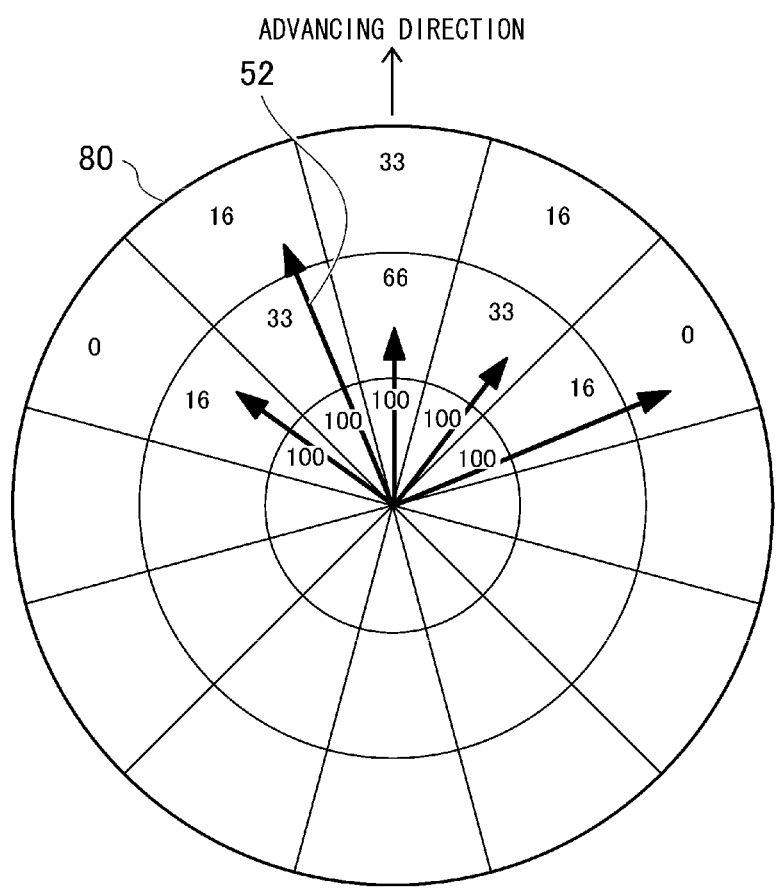
FIG. 4B is a diagram explaining the relative position information generation unit provided in the autonomous mobile device.

The relative position information is now explained with reference to FIG. 4A and FIG. 4B. FIG. 4A and FIG. 4B are diagrams explaining the relative position information generation unit 332. The relative position information generation unit 332 generates the relative position information by using a pie chart shown in FIG. 4A. The pie chart 80 is segmented by a plurality of straight lines extending radially and center around the current position of the autonomous mobile device 1, and a plurality of concentric circles about the position of the autonomous mobile device 1. The pie chart 80 is a polar plane based on the current position and advancing direction of the autonomous mobile device 1, and corresponds to a plane that is parallel to the travel surface of the autonomous mobile device 1.

In the pie chart 80, scores are respectively defined in the segments within a scanning range in which the peripheral obstacle information can be acquired by the laser range finder 20. In other words, in the pie chart 80, the fan-shaped zone positioned in the advancing direction of the autonomous mobile device 1 is assigned a score for each segment. Note that, for the sake of explanation, FIG. 4A and FIG. 4B show a case where the scanning range is a fan shape having a radius of about 1.5 m and a central angle of about 150 degrees, for example.

The scores are defined for each task, and stored in the storage unit 31. Moreover, the scores are set for each segment according to the level of interference of the autonomous mobile device and the obstacle upon executing the task. For example, as shown in FIG. 4A, the scores assigned to the task of "board elevator" are set to be a higher score as the segments are closer to the center, and set to be a higher score as the segments are closer to the advancing direction. In other words, when the autonomous mobile device 1 moves forward toward the elevator and an obstacle exists, higher scores are set to the zone where the possibility of a collision is higher.

As shown in FIG. 4B, the relative position information generation unit 332 uses the unknown obstacle information 52 and the pie chart 80, and calculates the scores assigned to the zone where the unknown obstacle exists. In the pie chart 80, the scores assigned to the segments corresponding to the zone where the unknown obstacle exists are the relative position information. The relative position information generation unit 332 generates relative position information for each sample of the unknown obstacle information 52.

Figure 5A:
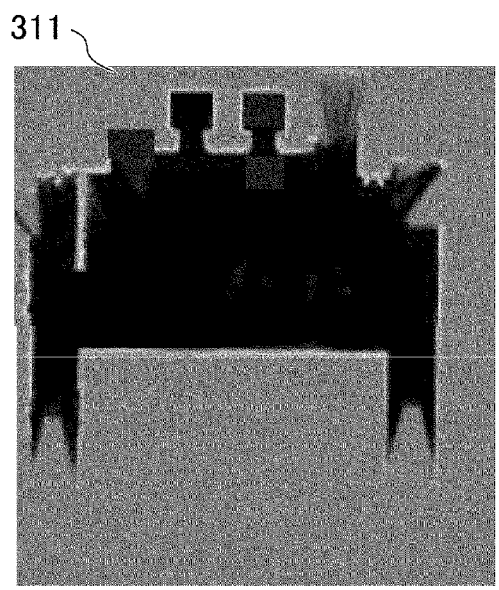
FIG. 5A is a diagram explaining the attribute map stored in the autonomous mobile device.
Figure 5B:
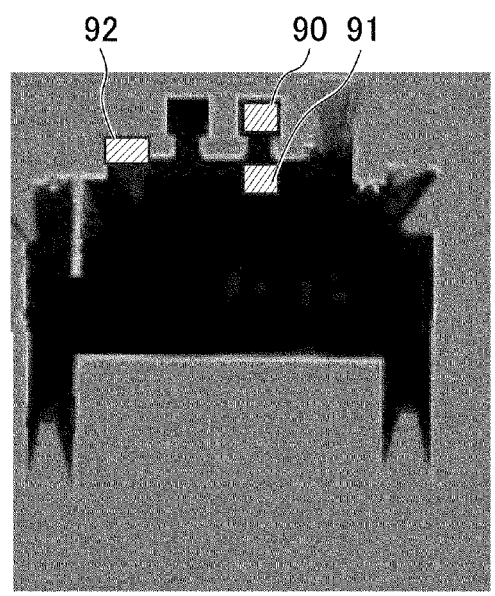
FIG. 5B is a diagram explaining the attribute map stored in the autonomous mobile device.
Figure 5C:
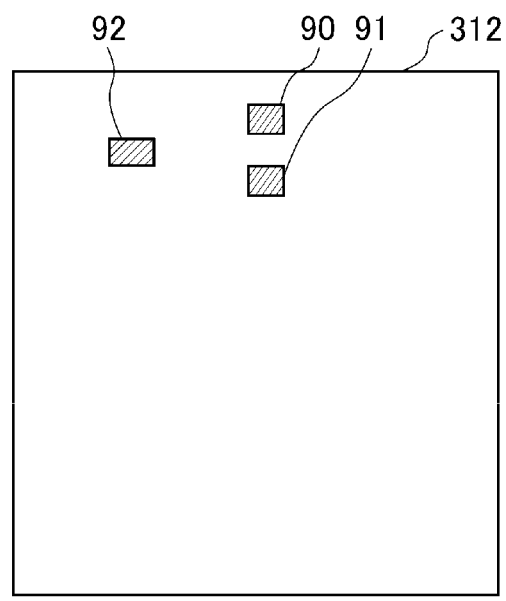
FIG. 5C is a diagram explaining the attribute map stored in the autonomous mobile device.

The attribute information is information showing the attribute of the zone where the unknown obstacle exists. The attribute information is now explained with reference to FIG. 5A to FIG. 5C. FIG. 5A to FIG. 5C are diagrams explaining the attribute information. FIG. 5A shows the environment map 311 as an example of the environment map. The black zone shows the zone without any obstacles, the white zone shows the zone containing an obstacle, and the gray zone shows a zone in which the existence of an obstacle is unknown.

FIG. 5C shows the attribute map 312 as an example of the attribute map. FIG. 5B is a diagram in which the environment map 311 and the attribute map 312 are superimposed for the sake of explanation. The attribute map 312 stores the attribute information by associating the attribute information with the position of areas 90 to 92 shown with a hatching.

The area 91 is the zone in the elevator car, and is associated with the attribute information of "elevator boarding detection area". The area 91 is the zone in front of the elevator, and is associated with the attribute information of "elevator exiting detection area". The area 92 is, for example, a stair case landing, and is associated with the attribute information of "no-entry area".

In other words, the attribute map 312 is information in which the meaning of the zone is defined. The attribute map 312 can be created by a user, for example, by using the environment map 311 displayed on a display. However, the environment map 311 and the attribute map 312 are stored in different layers, and configured so that they do not affect each other.

Figure 6A:
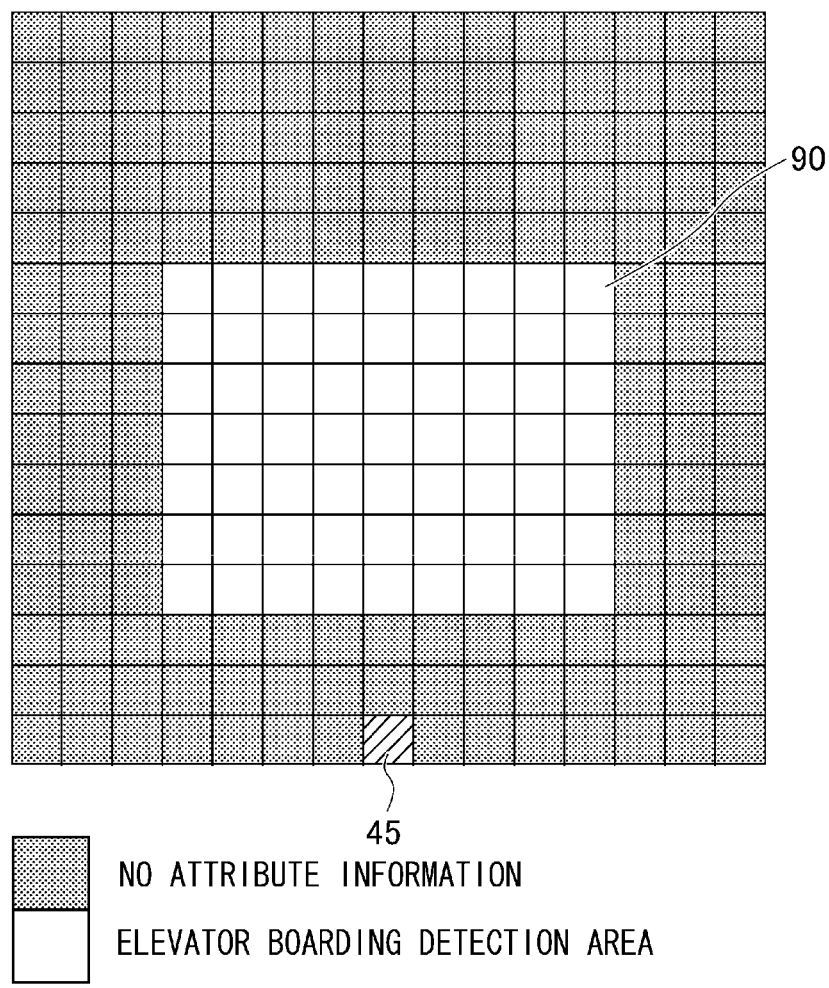
FIG. 6A is a diagram explaining the attribute information generation unit provided in the autonomous mobile device.
Figure 6B:
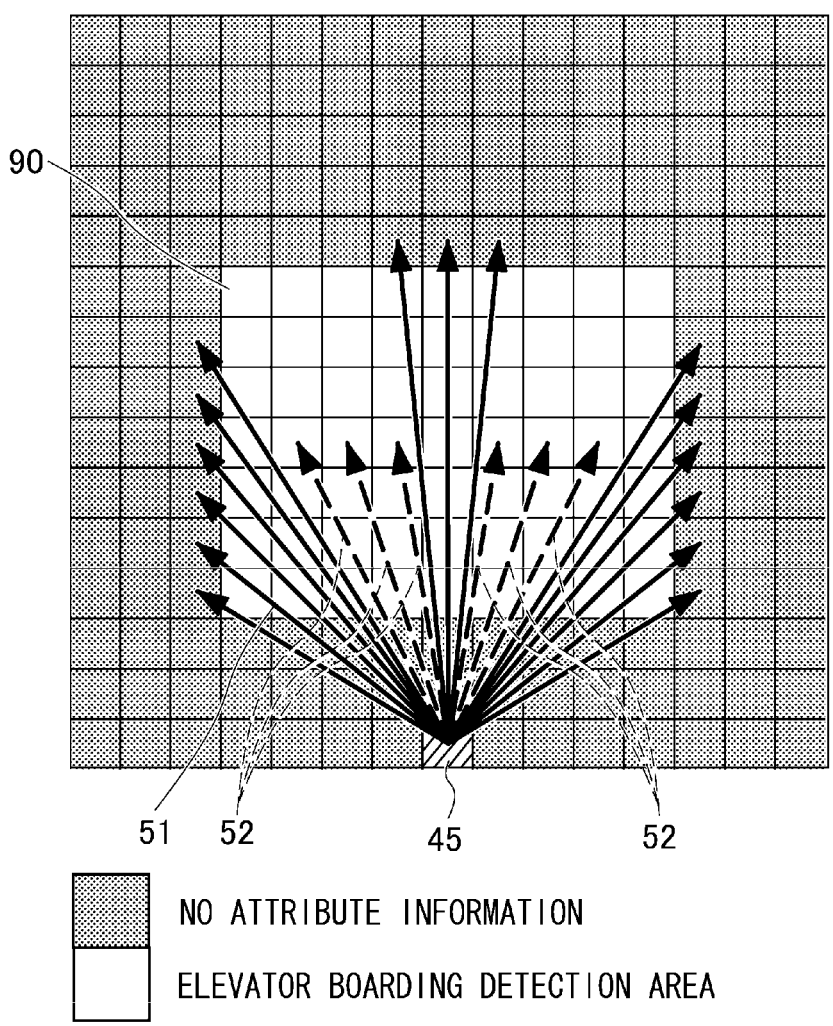
FIG. 6B is a diagram explaining the attribute information generation unit provided in the autonomous mobile device.

The attribute information generation unit 333 generates attribute information by using the attribute map 312 shown in FIG. 5C. FIG. 6A and FIG. 6B are diagrams explaining the attribute information generation unit 333. FIG. 6A shows the attribute map 312. The area 90 shown in white is the attribute information of "elevator boarding detection area". The peripheral gray zone is a zone where no attribute information is set. In FIG. 6B, the known obstacle information 51 is shown with a solid line arrow, and the unknown obstacle information 52 is shown with a broken line arrow.

The attribute information generation unit 333 calculates the attribute information of the zone where an unknown obstacle exists by using the attribute map 312 and the unknown obstacle information 52. The attribute information generation unit 333 generates attribute information for each sample of the unknown obstacle information 52. As shown in FIG. 6B, the attribute of the zone where an unknown obstacle exists shown with six unknown obstacle information 52 is "elevator boarding detection area". Note that, by using the unknown obstacle information 52 that was subject to coordinate transformation in accordance with the coordinate system of the environment map 311, the attribute information generation unit 333 can identify the corresponding position on the attribute map 312 regarding the unknown obstacle information 52 acquired at the respective points in time even when the autonomous mobile device 1 is moving.

Figure 7:
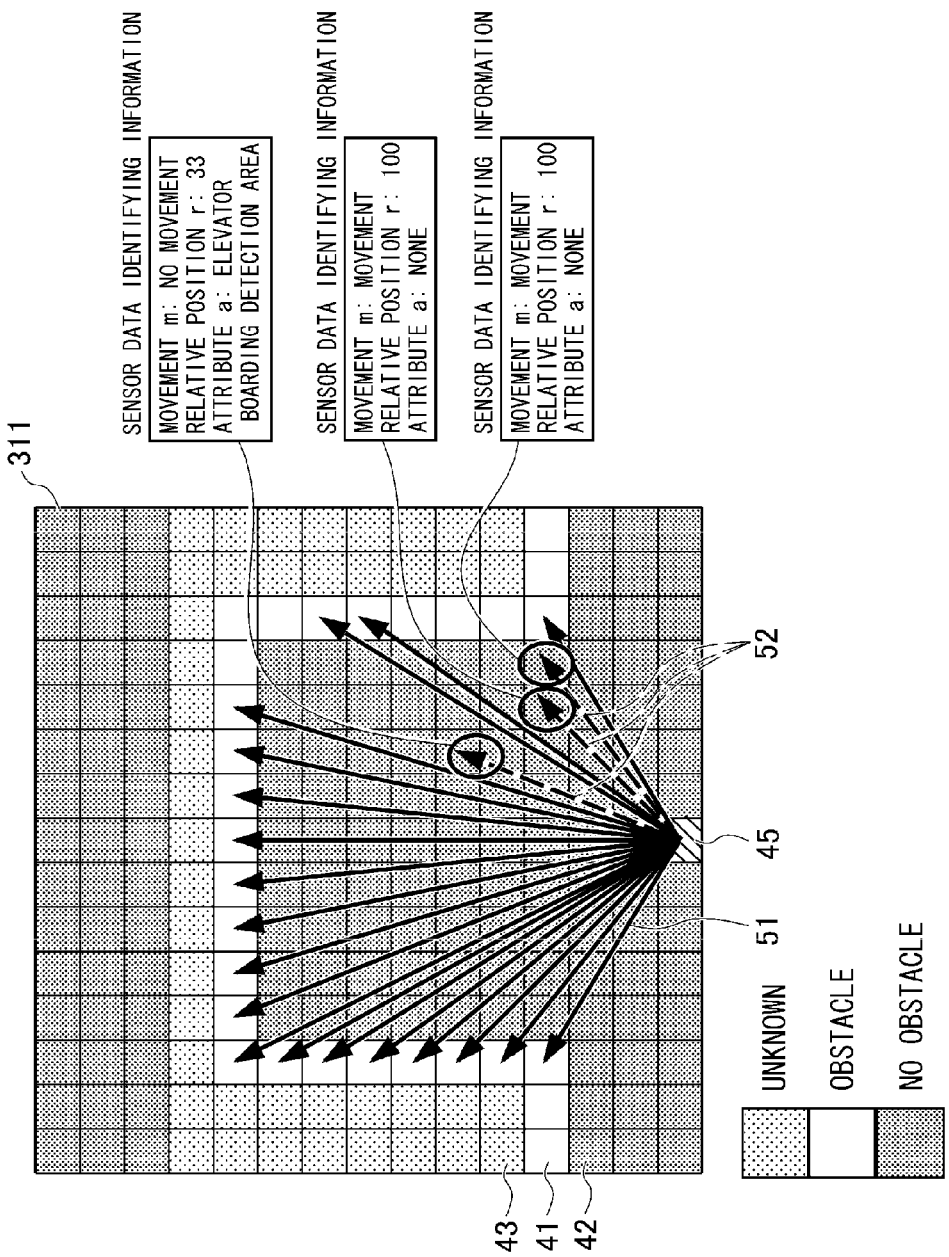
FIG. 7 is a diagram explaining the assessment information generated by the autonomous mobile device.

Based on the movement information generation unit 331, the relative position information generation unit 332, and the attribute information generation unit 333 described above, the assessment information acquisition unit 33 acquires the sensor data identifying information configured from three types of assessment information; namely, the movement information, the relative position information and the attribute information for each sample regarding the unknown obstacle information 52. FIG. 7 is a diagram explaining the assessment information.

As shown in FIG. 7, when three samples are acquired as the unknown obstacle information 52, sensor data identifying information is generated for each of the three samples. For example, the sensor data identifying information includes movement information m "no movement", relative position information r "33", and attribute information a "elevator boarding detection area". Accordingly, since the assessment information acquisition unit 33 generates sensor data identifying information for each sample, it is possible to generate assessment data of high resolution by using all unknown obstacle information 52.

Figure 8:
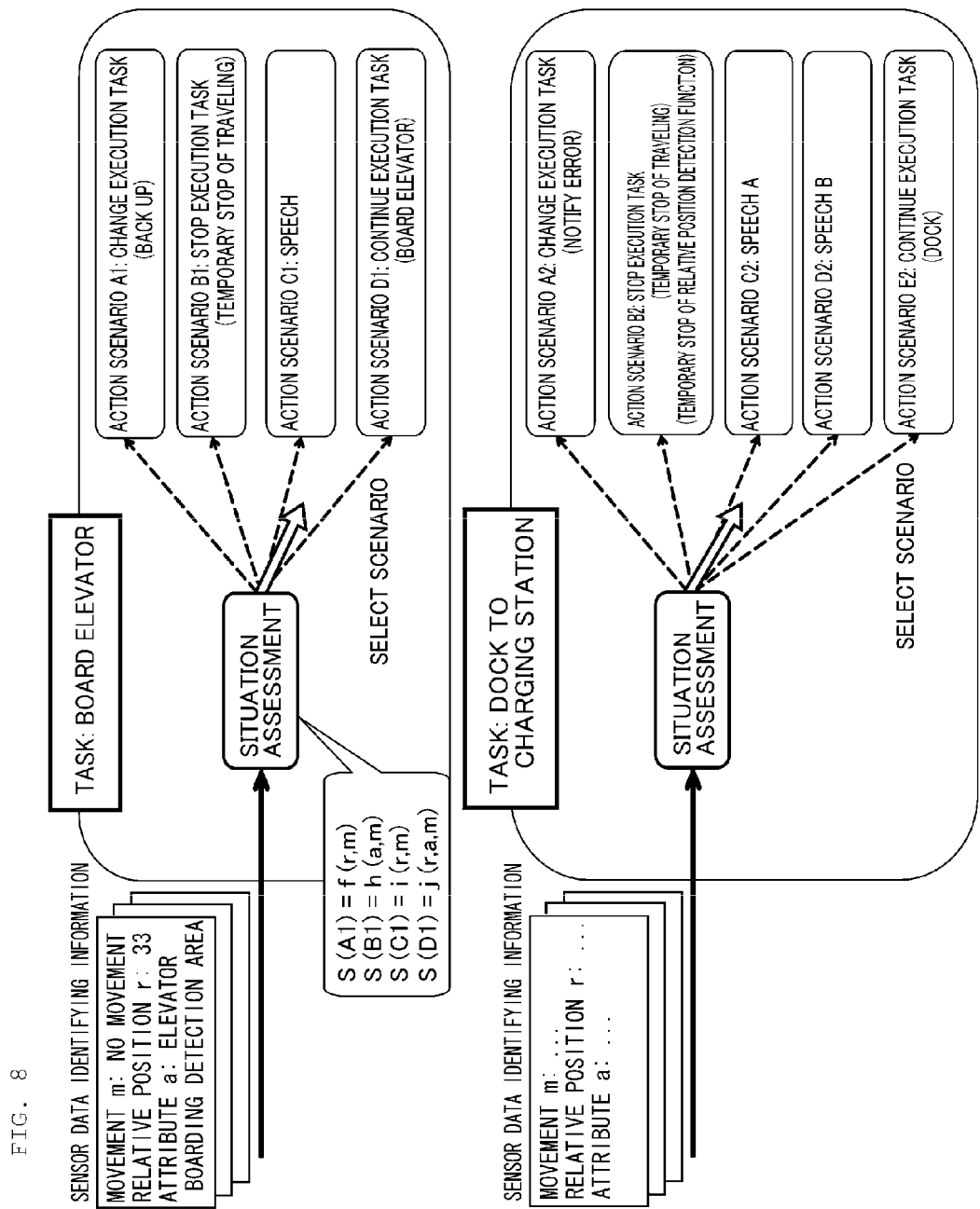
FIG. 8 is a diagram explaining the scenario selection unit provided in the autonomous mobile device.

The scenario selection unit 34 is now explained with reference to FIG. 8. FIG. 8 is a diagram explaining the scenario selection unit 34. The scenario selection unit 34 selects one action scenario from a plurality of action scenarios based on a plurality of types of assessment information including the movement information, the relative position information, and the attribute information acquired by the assessment information acquisition unit 33. In other words, the scenario selection unit 34 is a non-limiting example of a selection device recited in the claims.

The plurality of action scenarios include an action scenario to cancel the execution of the task, an action scenario to continue the execution of the task, and an action scenario that is defined to execute the task. Note that the action scenario defined to execute the task is an action scenario other than the action scenario to cancel the execution of the task and the action scenario to continue the execution of the task. For example, the action scenario defined to execute the task is a scenario to execute an action that is defined separate from the task such as temporarily stopping the execution of the task and temporarily stopping the movement of the autonomous mobile device 1, or transmitting a speech while continuing the execution of the task.

The plurality of action scenarios are defined for each task, associated with the task, and then stored in the storage unit 31. For example, four action scenarios A1 to D1 are defined for the task of "board elevator", and five action scenarios A2 to E2 are defined for the task of "dock to charging station".

The scenario selection unit 34 inputs the plurality of sensor data identifying information generated for each sample of the unknown obstacle information 52, and executes the status determination processing defined for each task. As the status determination processing, the scenario selection unit 34 computes the overall score using at least one type of assessment information for each of the plurality of action scenarios. Computation processing for computing the overall score for each action scenario is defined, and the assessment information as the parameter that is used in the computation processing is also set for each action scenario.

For example, the scenario selection unit 34 computes the overall scores S(A1), S(B1), S(C1), S(D1) for each of the action scenarios A1 to D1 for the task of "board elevator". The overall score $S(A1)=f(r, m)$ of the action scenario A1 is defined to be computed by using the relative position information r and the movement information m.

The arithmetic expression of the overall score is defined so that the computed overall score will show the relevance level of the respective action scenarios to become the candidate in the situation obtained from the assessment information. The scenario selection unit 34 computes the overall score for each action scenario, and thereafter selects the action scenario with the highest overall score. Subsequently, the electronic control unit 30 controls the autonomous mobile device to take action according to the action scenario that was selected by the scenario selection unit 34.

For example, the action scenario A1 defined for the task of "board elevator" is "change execution task (back up)", and is an action scenario to cancel the execution of the task. The action scenario A1 is selected, for example, when the task cannot be continued such as when the elevator is full. When this action scenario A1 is selected, the task that is being executed is once canceled, the autonomous mobile device 1 backs up, and the task of "board elevator" is re-tried.

The action scenario B1 is "stop execution task (temporary stop of traveling)", and is an action scenario that is defined in advance for executing the task. When this action scenario B1 is selected, the task that is being executed is once temporarily stopped, and the autonomous mobile device 1 temporarily stops traveling. In addition, for example, the task may be continued after the autonomous mobile device 1 transmits a speech such as "I am boarding the elevator. Please be careful."

The action scenario C1 is "speech", and is an action scenario that is defined in advance for executing the task. For example, the action scenario C1 is selected when there is someone in the elevator. This action scenario C1 is a scenario to transmit a speech such as "I am boarding the elevator. Please make room", and is an action scenario to request the person in the elevator to move. In the foregoing case, the autonomous mobile device 1 can change the situation so that the task can be executed by transmitting a speech in accordance with the situation.

The action scenario D1 is "continue execution task (board elevator)", and is an action scenario to continue the task without any change to the plan. When this action scenario D1 is selected, the autonomous mobile device 1 boards the elevator without change.

Moreover, the action scenario A2 that is defined for the task of "dock to charging station" is a scenario in which the task that is being executed is once canceled and an error is notified. The action scenario B2 is a scenario in which the task that is being executed is temporarily stopped and the travel and relative position detection function are temporarily stopped. Note that the relative position detection function is the function of calculating the relative position of the docking position of the charging station to the autonomous mobile device 1. The action scenarios C2, D2 are scenarios to transmit a speech to execute the task. The action scenario E2 is a scenario to continue the task without any change to the plan.

Figure 9:
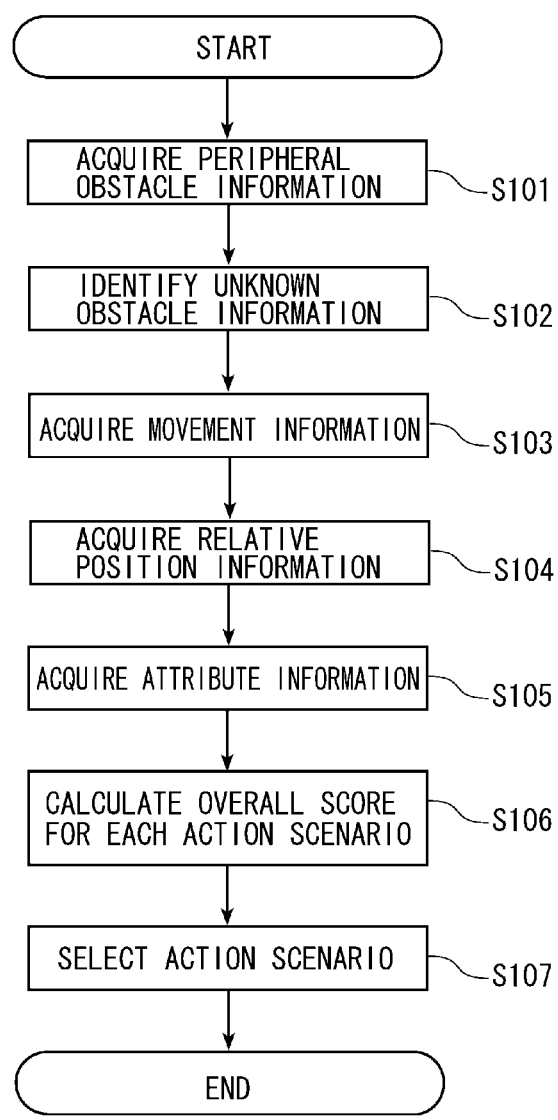
FIG. 9 is a flowchart showing the processing routine of the action scenario selection processing performed by the autonomous mobile device.

The operation of the autonomous mobile device 1 is now explained with reference to FIG. 9. FIG. 9 is a flowchart showing the processing routine of the selection processing of the action scenario to be performed by the autonomous mobile device 1.

While the autonomous mobile device 1 is autonomously moving along a path to a destination, after the autonomous mobile device reaches a via point that is set for a task, the execution of the corresponding task is started. In addition, in step S101, the peripheral obstacle information 50 is acquired by the laser range finder 20. Subsequently, in step S102, the unknown obstacle information 52 is identified by the unknown information identification unit 32 from the peripheral obstacle information 50. Subsequently, in steps S103 to S105, the movement information, the relative position information, and the attribute information are generated by the assessment information acquisition unit 33 for each sample of the unknown obstacle information 52. The method of generating the foregoing assessment information is as described above, and the detailed explanation thereof is omitted here.

In addition, in step S106, the overall score is calculated by the scenario selection unit 34 for each action scenario by using the movement information, the relative position information, and the attribute information. Subsequently, in step S107, one action scenario with the highest overall score is selected by the scenario selection unit 34. In addition, the selected action scenario is executed. Note that, if the selected action scenario includes a speech, audio information stored in the storage unit 31 in advance is output from the speaker 35.

For example, when the task of "board elevator" is executed and the unknown obstacle is a person in the elevator, the action scenario B1 of transmitting a speech of "I am boarding the elevator. Please be careful" is selected. If the person moves as a result of hearing the speech, the autonomous mobile device 1 boards the elevator, and the execution of the task of boarding the elevator is complete. The autonomous mobile device 1 thereafter autonomously moves to its destination.

According to the autonomous mobile device 1 described above, upon executing a task, the unknown obstacle information 52 is identified by the unknown information identification unit 32 from the acquired peripheral obstacle information 50. When the unknown obstacle information 52 is identified, assessment information related to the unknown obstacle is acquired by the assessment information acquisition device 33. In addition, one action scenario among the plurality of action scenarios A1 to D1 is selected by the scenario selection unit 34 based on the acquired assessment information. The plurality of action scenarios A1 to D1 include action scenarios B1, C1 which are defined to execute the task and are action scenarios other than the action scenario to cancel or continue the execution of the task. In other words, it is possible to select an action scenario suitable for executing the task in accordance with the situation other than canceling or continuing the execution of the task. Accordingly, even in cases where an unknown obstacle exists, it is possible to take action that is suitable to execute the task in accordance with the situation without having to cancel the execution of the task.

Moreover, with the autonomous mobile device 1, since the action scenario is selected based on a plurality of types of assessment information, it is possible to select an action scenario that is more suitable for the situation. Moreover, since the overall score is computed by using at least one type of assessment information for each of the plurality of action scenarios A1 to D1, the action scenario is selected by using comprehensive information which integrates the plurality of types of assessment information for each of the plurality of action scenarios A1 to D1. Consequently, it is possible to accurately execute complicated information processing of selecting one action scenario from a plurality of action scenarios based on a plurality of types of assessment information.

Moreover, with the autonomous mobile device 1, since the action scenario is selected based on a plurality of types of assessment information including movement information, relative position information, and attribute information, upon executing a task involving movement, it is possible to select the optimal action scenario according to the movement of the obstacle, positional relationship of the autonomous mobile device and the obstacle, and attribute of the zone where the obstacle exists. Moreover, the movement information, the relative position information, and the attribute information are information concerning the zone related to the execution of the task such as the zone where the autonomous mobile device 1 is to move upon executing the task or the peripheral zone thereof. Accordingly, it is possible to select an action scenario that is suitable to execute the task in accordance with the situation without having to detect the movement, position, size or the like of the unknown obstacle itself.

Moreover, with the autonomous mobile device 1, a plurality of action scenarios A1 to D1 are defined for the task of "board elevator", and a plurality of action scenarios A2 to E2 are defined for the task of "dock to charging station". Thus, it is possible to select the action scenario according to the task to be executed in accordance with the situation.

Moreover, with the autonomous mobile device 1, the unknown obstacle information 52 is identified by using the environment map 311 that is used to create a path plan. In the foregoing case, the autonomous mobile device 1 creates a path plan using the environment map 311 and executes a task on the path thus planned, the autonomous mobile device 1 identifies the unknown obstacle information 52 and selects the action scenario according to that situation. In other words, it is possible to deal with unknown obstacles which cannot be dealt with only via path planning.

Moreover, with the autonomous mobile device 1, since a score is set for each segment according to the level of interference of the autonomous mobile device and the obstacle during the execution of the task, it is possible to select an action scenario that is more suitable for the situation.

Moreover, with the autonomous mobile device 1, since the segments are separated by a plurality of straight lines extending radially from the position of the autonomous mobile device, and by a plurality of concentric circles about the position of the autonomous mobile device, the score according to the direction and distance based on the autonomous mobile device can be used as the relative position information. Accordingly, it is possible to accurately select the action scenario according to the position of the unknown obstacle relative to the autonomous mobile device.

Moreover, with the autonomous mobile device 1, since the scores are assigned to the segments for each of the tasks, it is possible to select the action scenario by using the relative position information according to the task.

A preferred embodiment of the present invention is described above, but the present invention is not limited to the foregoing preferred embodiment, and may be modified in many different ways. For example, in the foregoing preferred embodiment, while the laser range finder 20 is preferably used as the device to acquire the peripheral obstacle information, a stereo camera or an ultrasound sensor or a combination thereof may be used instead of the laser range finder 20.

Moreover, for example, in the foregoing preferred embodiment, while information showing whether the measurement point of the unknown obstacle information is dynamic or static is preferably used as the movement information, it is also possible to detect whether or not the unknown obstacle itself is dynamic, and use the result thereof as the movement information. Moreover, the assessment information is not limited to the combination of the movement information, the relative position information, and the attribute information. For example, the assessment information may also include information showing whether or not the unknown obstacle is a person. Moreover, in the foregoing preferred embodiment, while a pie chart is preferably used to generate the relative position information, a chart divided in a grid shape may also be used. Moreover, the tasks and action scenarios are not limited to the foregoing preferred embodiment, and may also be other tasks and other action scenarios.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

The invention claimed is:

1. An autonomous mobile device that executes a task upon autonomously moving to a destination, comprising:
   a known information storage device that stores information on known obstacles;
   a peripheral information acquisition device that acquires peripheral obstacle information;
   an identification device that identifies information on an unknown obstacle that is different from the known obstacles stored in the known information storage device, from the peripheral obstacle information acquired by the peripheral information acquisition device;
   an assessment information acquisition device that acquires assessment information related to the unknown obstacle when the information on the unknown obstacle is identified by the identification device;
   a scenario storage device that stores a plurality of action scenarios including a first action scenario which is defined to execute the task and is other than a second action scenario to cancel or continue the execution of the task; and
   a selection device that selects one action scenario among the plurality of action scenarios stored in the scenario storage device based on the assessment information acquired by the assessment information acquisition device; wherein
   the task is executed after the autonomous mobile device reaches a pre-registered via point on a travel path to the destination;
   the assessment information acquisition device acquires a plurality of types of assessment information, and upon selecting the action scenario based on the plurality of types of assessment information acquired by the assessment information acquisition device, the selection device selects the action scenario based on comprehensive information obtained by computing using at least one type of assessment information for each of the plurality of action scenarios;
   the assessment information acquisition device acquires, as the assessment information related to the unknown obstacle, at least two types of information from among:
   movement information related to the movement of the unknown obstacle;
   relative position information related to the relative position of the unknown obstacle relative to the autonomous mobile device; and
   attribute information of a zone where the unknown obstacle exists; and
   the relative position information is a score that is assigned to each of segments of the zone where the unknown obstacle exists based on the position of the autonomous mobile device.

2. The autonomous mobile device according to claim 1, wherein the scenario storage device stores the plurality of action scenarios for each of the plurality of tasks, and the selection device selects one action scenario from the plurality of action scenarios in accordance with the respective tasks.

3. The autonomous mobile device according to claim 1, wherein the known information storage device stores, as the information on the known obstacle, an environment map showing a zone of the known obstacle, and the identification device identifies the information on the unknown obstacle by comparing the peripheral obstacle information with the environment map.

4. The autonomous mobile device according to claim 1, wherein the assessment information acquisition device generates the movement information based on a history of the information on the unknown obstacle.

5. The autonomous mobile device according to claim 1, wherein the assessment information acquisition device generates the movement information for each sample of the information on the unknown obstacle.

6. The autonomous mobile device according to claim 1, wherein the assessment information acquisition device acquires the movement information, the relative position information, and the attribute information for each sample of the information on the unknown obstacle.

7. The autonomous mobile device according to claim 1, wherein the segments are separated by a plurality of straight lines extending radially from the position of the autonomous mobile device, and by a plurality of concentric circles about the position of the autonomous mobile device.

8. The autonomous mobile device according to claim 1 wherein the scores are assigned to the segments for each of the tasks.

9. The autonomous mobile device according to claim 1, wherein the segments to which the scores are assigned are within a range in which the peripheral obstacle information is capable of being acquired by the peripheral information acquisition device.

10. The autonomous mobile device according to claim 1, wherein the peripheral obstacle information is information on an obstacle existing above a travel surface of the autonomous mobile device.

11. The autonomous mobile device according to claim 1, wherein the peripheral information acquisition device includes at least one of a laser range finder, a stereo camera, and an ultrasound sensor.

12. The autonomous mobile device according to claim 1, wherein the task is boarding an elevator.

13. The autonomous mobile device according to claim 1, wherein the task is docking to a charging station.

14. The autonomous mobile device according to claim 1, wherein the scenario storage device stores the plurality of action scenarios for each of the plurality of tasks, and the selection device selects one action scenario from the plurality of action scenarios in accordance with the respective tasks.

15. The autonomous mobile device according to claim 1, wherein the scenario storage device stores the plurality of action scenarios for each of the plurality of tasks, and the selection device selects one action scenario from the plurality of action scenarios in accordance with the respective tasks.

16. The autonomous mobile device according to claim 1, wherein the known information storage device stores, as the information on the known obstacle, an environment map showing a zone of the known obstacle, and the identification device identifies the information on the unknown obstacle by comparing the peripheral obstacle information with the environment map.

17. The autonomous mobile device according to claim 1, wherein the known information storage device stores, as the information on the known obstacle, an environment map showing a zone of the known obstacle, and the identification device identifies the information on the unknown obstacle by comparing the peripheral obstacle information with the environment map.

\* \* \* \* \*